US005561657A

United States Patent [19]

Ogawa

[11] Patent Number: 5,561,657
[45] Date of Patent: Oct. 1, 1996

[54] MAGAZINE FOR READ/WRITE DISKS AND METHOD AND DEVICE FOR READING AND WRITING OF SAID READ/WRITE DISKS

[75] Inventor: Hisashi Ogawa, Musashino, Japan

[73] Assignee: Shinwa Kabushiki Kaisha, Tokyo, Japan

[21] Appl. No.: 350,914

[22] Filed: Dec. 7, 1994

[30] Foreign Application Priority Data

Dec. 15, 1993 [JP] Japan .................................. 5-315528

[51] Int. Cl.$^6$ ............................ G11B 17/22; G11B 17/04
[52] U.S. Cl. ............................ 369/179; 369/34; 369/36
[58] Field of Search ............................ 369/34, 36, 38, 369/39, 75.1, 75.2, 178, 179, 192, 193, 194; 360/98.06, 98.04

[56] References Cited

U.S. PATENT DOCUMENTS

| | | | |
|---|---|---|---|
| 2,308,880 | 1/1943 | Hokanson | 369/34 |
| 2,960,340 | 11/1960 | Seidel et al. | 369/34 |
| 3,236,525 | 2/1966 | Moody | 369/34 |
| 4,998,618 | 3/1991 | Borgions | 369/38 |
| 5,099,466 | 3/1992 | Kimura et al. | 369/36 |
| 5,136,563 | 8/1992 | Takewasa et al. | 369/36 |
| 5,481,512 | 1/1996 | Morioka et al. | 369/36 |

FOREIGN PATENT DOCUMENTS

| | | | |
|---|---|---|---|
| 61-61262 | 3/1986 | Japan | 369/33 |
| 2-143942 | 6/1990 | Japan | 369/191 |
| 4-61080 | 2/1992 | Japan | 369/178 |

Primary Examiner—Stuart S. Levy
Assistant Examiner—David L. Ometz
Attorney, Agent, or Firm—Joseph C. Mason, Jr.; Louise A. Foutch

[57] ABSTRACT

A compact disk changer includes a magazine having an inner body and an outer body that are rotatable independently of one another about a common axis of rotation. The inner and outer bodies are slideably interconnected by a helical member so that relative rotation between the bodies in a first direction increases the axial spacing between them and relative rotation in a second direction decreases the axial spacing. This construction reduces the size of the changer and does not require precision tolerances between moving parts. A plurality of compact discs are stacked within the magazine, and each disk is supported by a disk holder. When the disk at the top or end of the stack is to be played, relative rotation between the inner and outer bodies creates an axially extending space, adjacent the selected disk and a playing mechanism is inserted into that space. When a disk at any other position within the stack is to be played, the disk holder is engaged and the inner and outer bodies are rotated with respect to one another so that the disk holder immediately below the engaged disk holder is axially displaced with respect to the disk to be played. This creates a space into which the playing mechanism is inserted.

2 Claims, 12 Drawing Sheets

MAGAZINE FOR READ/WRITE DISKS AND METHOD AND DEVICE FOR READING AND WRITING OF SAID READ/WRITE DISKS

BACKGROUND OF THE INVENTION

The present invention relates to a magazine which contains a plurality of read/write disks. It also relates to a method and a device to select one of the read/write disks contained in the magazine and perform reading and/or writing of the selected disk.

DESCRIPTION OF THE PRIOR ART

Examples of conventional devices which call for employing a method of selecting one of a plurality of stacked read/write disks and performing reading and/or writing of the selected disk include a CD changer for playing compact disks (hereinafter referred to as a CD or CDs).

As described, for example, in Japanese Utility Model Publication Laid Open No. 85992/1987 and the like No. 90452/1987, a CD changer is typically provided with a magazine which is capable of containing a given number of CDs (for example six CDs) stacked one atop another and a changing device which accepts the magazine and performs the play function. The changing device has magazine insertion space for containing a magazine which is set in the changing device and play space which is located at a side of the magazine insertion space. A desired compact disk is drawn in a direction parallel to the radius of the disk out of the magazine into the play space to be played.

A CD changer of the type described above is relatively bulky because it requires a magazine insertion space and a playback space to be provided inside the changing device. Therefore, in case of, for example, a six-disk CD changer for an automobile, it is impossible to install the entire changing device at the center of the dashboard. Typically, the controller alone is disposed at the center, and the changing device is installed at a separate location, such as inside the trunk.

An example of a means of solving this problem is offered in Japanese Patent Publication Laid-Open No. 235248/1991, which discloses a CD changer capable of performing play of a CD in the magazine insertion space by means of dividing, in the direction in which disks are stacked, the magazine inserted in the magazine insertion space of the changing device, and inserting a playback unit which incorporates a CD rotating motor and a laser pickup into the space that has been formed between holders as a result of the separation of the magazine. As a CD changer having this configuration does not require provision of a separate playback space, the lateral area of the changing device is reduced almost to half.

The magazine of this CD changer is comprised of a pair of body halves, i.e. an upper body half and a lower body half, which can be separated from each other in the vertical direction, and a plurality of holders disposed between the upper and lower body halves to support read/write disks, the holders not being connected to each other. The dividable magazine has a plurality of pillars around the edge of the lower body half and a pivotable catching member so disposed on the inner surface of the upper body as to be able to freely catch the top of each pillar in the direction outward from the rim of a disk. In the assembled state of the magazine, the catching member is caught with the top of each pillar so that the magazine is maintained with its upper and lower body halves being joined and the plurality of holders being sandwiched between the upper and lower body halves. When dividing the magazine, the catching member is pivoted so as to be disengaged from the pillars, thereby separating the upper and lower body halves and allowing the holders to move between the separated half body halves.

A changing device for the above magazine includes a means of pivoting the catching member described above and an open/close switching mechanisms for separating and moving the lower body half and the holders in the direction in which disks are stacked. The open/close switching mechanisms are disposed at two locations around the portion into which the magazine is inserted, and each open/close switching mechanisms is provided with a plurality of levers, which are capable of catching the lower body half and the respective holders, and cams to swing these levers. As the result, the levers swing interlockingly with the cams, which are rotated by an open/close switching motor, lowering the lower body half and the holders located lower than the holder which supports the CD to be played, thereby opening a space into which the playback unit advances.

The playback unit is provided with an arm having a driving system and a laser pickup disposed around a shaft, which is vertically disposed to a side of the magazine insertion space, configured so the arm is pivoted between a playback position where the arm has been advanced into the magazine, more precisely the magazine insertion space, and a retreated position where the arm has been moved out of the magazine, i.e. the magazine insertion space. By means of an arm elevating motor, the arm is also moved in the direction in which the disks are stacked to a position corresponding to the position of the CD to be played with respect to the direction in which the disks are stacked.

As described above, a magazine disclosed in Japanese Patent Publication Laid-Open No. 235248/1991 has a dividable configuration comprising a lower body half having a plurality of pillars and an upper body half having a pivotable catching member. In addition to being complicated, however, such a dividable configuration is prone to irregularity of positions where the pillars are engaged with the catching member, resulting in incomplete or inaccurate assembly and/or separation. In order to ensure the stable performance of assembly and separation over a long period of time, high precision of a device is required. Furthermore, as the catching member is provided inside the upper body half where CDs are contained, the vertical dimension of the magazine is limited and therefore the number of CDs to be contained in the magazine decreases by the dimension of the catching member. On the other hand, securing the number of CDs to be contained, for example, to six items or so increases the thickness of the magazine in the direction in which the disks are stacked.

Moreover, as the configuration of the magazine which calls for assembling and separating the upper and lower body halves of the magazine and the plurality of holders complicates the mechanism of assembling and dividing the magazine as well as the mechanism for selecting appropriate holders, high precision is also required of the positional relationship between the magazine and its assembling/dividing mechanism and the positional relationship between the holders and the holder selection mechanism.

Another problem of said device lies in that although it has a stopper to prevent the arm from pivoting further than its playback position and the retreated position, there is no mechanism to hold the arm at the playback position or the retreated position. Therefore, especially in cases where it is used in an automobile, there is the possibility for the arm pivoted to the playback position or the retreated position to be accidentally moved in the opposite direction and dislocated due to bumps or other shocks. Dislocation of the arm often causes various problems: should the arm project into the magazine insertion space when the magazine is not in the space, it hinders insertion of the magazine; in cases where such dislocation happens during the playback mode, it may cause the rotating CD to come into contact with the inner wall of the magazine.

Although the position of the holders selected by the open/close switching mechanism corresponds to the position of the arm with respect to the direction in which disks are stacked, the open/close switching mechanism and the arm have their respective special motors: a motor for open/close switching and another motor for elevating the arm. This makes the structure of the device complicated and bulky and also increases the cost of the device. Moreover, as the driving source of the open/close switching mechanism is separated from the source that moves the arm in the direction in which the disks are stacked., there is the danger of discrepancy between the positions of the holders selected by the open/close switching mechanism and the arm with respect to the direction in which the disks are stacked, resulting in unstable operation during playback of a CD.

In order to solve the above problem, an object of the present invention is to ensure stable opening and closing of a magazine with a simple configuration which is capable of increasing the number of read/write disks to be contained therein within a specified vertical dimension. Another object of the present invention is to reduce the size of a read/write device while simplifying a mechanism for opening and closing the magazine and a mechanism for selecting holders without requiring high precision in the positional relationship between the magazine and its open/close mechanism, holders, or a mechanism for selecting holders. Yet another object of the present invention is to provide a simple structure to maintain the arm at the read/write position or the retreated position. Yet another object of the present invention is to simplify the structure of the device and at the same time ensure stable performance of read and write function by using a single driving means to interlock movement of the selecting means and the arm in the direction in which the disks are stacked.

SUMMARY OF THE INVENTION

A magazine for read/write disks according to claim 1 comprises an outer body; an inner body which is capable of fitting in the outer body; a connection supporting means which is provided at a side of the magazine, where the inner body and the outer body overlap each other, and maintains connection between the outer body and the inner body while permitting them to rotate in opposing directions parallel to the circumference of the disk and, concurrently with this rotation, move apart or together in the direction in which the disks are stacked, thereby opening or closing the magazine; and a plurality of holders which respectively support a plurality of read/write disks, the holders being so disposed in the inner body as to be capable of moving in the direction in which the disks are stacked together with rotation of the inner body.

A method of reading and writing data from and onto read/write disks according to claim 2 of the invention calls for stacking a plurality of read/write disks in a magazine comprising an inner body and an outer body which are capable of moving in opposing directions to be apart or together, thereby opening or closing with connection therebetween being constantly maintained; opening the inner body and the outer body from a side while moving a number of read/write disks in the direction in which the disks are stacked to open a space between any two adjacent read/write disks; advancing a read/write unit into the space; rotating one of the read/write disks which faces the space by means of a driving system of the read/write unit; and at the same time, by using a read/write head or a laser pickup of the read/write unit, performing reading or writing of the read/write disk while it is being rotated.

A read/write device for read/write disks according to claim 3 of the invention comprises a magazine which has an inner body and an outer body and contains a plurality of read/write disks stacked one atop another, the inner body and the outer body being capable of moving apart or together, thereby closing and opening with connection therebetween being constantly maintained; a main body of a read/write device having a magazine insertion section which permits the magazine to be inserted therein and removed therefrom; a selecting mechanism which is provided to a side of the interior of the magazine insertion section and selects a desired read/write disk from among the disks contained in the magazine; an open/close mechanism which is provided to a side of the interior of the magazine insertion section, opens the inner body and the outer body of the magazine and moves a number of disks from among said read/write disks in the direction in which the disks are stacked so as to form a space between the read/write disk selected by the selecting mechanism and a read/write disk adjacent thereto; and a read/write unit which is provided to a side of the interior of the magazine insertion section in such a manner as to be capable of advancing into and retreating from the aforementioned space formed between the read/write disks and has a driving system and a read/write head or a laser pickup, the driving system being provided in order to rotate a read/write disk which faces said space, the read/write head or the laser pickup being provided in order to write and/or read data onto or from the read/write disk which is being rotated, and the read/write unit being capable of positioning the read/write head or the laser pickup at the read/write position.

A read/write device for read/write disks according to claim 4 of the invention comprises a magazine which contains a plurality of read/write disks stacked one atop another and has a configuration such that the inner body and the outer body are capable of rotating in opposing directions parallel to the circumference of the disk and concurrently with said rotation moving apart or together in the direction in which the disks are stacked, thereby closing or opening with connection therebetween being constantly maintained; a main body of a read/write device having a magazine insertion section which permits the magazine to be inserted therein and removed therefrom; a slider which is provided along the curved edge of the magazine insertion section in such a manner that the slider is capable of rotating in the direction parallel to the circumference of the disk and has a catching portion which is capable of catching either the outer body or the inner body of the magazine inserted in the magazine insertion section and rotating the one with which the catching portion is engaged in the direction parallel to the circumference of the disk; and a driving means for rotating the slider in one direction or the other.

A read/write device for read/write disks according to claim 5 of the invention comprises a magazine wherein the inner body and the outer body are capable of rotating in opposing directions parallel to the circumference of the disk and concurrently with said rotation moving apart or together in the direction in which the disks are stacked, thereby closing and opening with connection therebetween being constantly maintained, and a plurality of holders each carrying a read/write disk are contained in the magazine in such a manner that the holders are capable of moving in the direction in which the disks are stacked concurrently with said rotation in the direction parallel to the circumference of the disk; a main body of a read/write device having a magazine insertion section which permits the magazine to be inserted therein and removed therefrom; an open/close mechanism for rotating the inner body of the magazine in the direction parallel to the circumference of the disk when the magazine is in the magazine insertion section; and a selecting means which selectively catches a holder carrying a read/write disk to be written or read from among the aforementioned holders, thereby preventing the selected holder from moving.

A read/write device for read/write disks according to claim 6 of the invention comprises a magazine which contains a plurality of read/write disks stacked one atop another; a main body of a read/write device having a magazine insertion section which permits the magazine to be inserted therein and removed therefrom; an arm which has a driving system for rotating a read/write disk and a read/write head or a laser pickup to perform writing and/or reading of the disk, the arm being capable of pivoting around a shaft vertically disposed to a side of the interior of the magazine insertion section so that the arm may be advanced to a read/write position in the magazine or retreated to a retreated position outside the magazine; a pair of female parts of engagement formed in the arm at positions respectively corresponding to the read/write position and the retreated position of the arm; and a driving mechanism having a catching portion which is provided in the path for transmitting the driving force of the driving mechanism and is capable of pivoting, through the driving force transmitted from the driving mechanism, the arm to its read/write position and the retreated position, the catching portion catching the corresponding female part of engagement only when the arm is at its read/write position or the retreated position and remains disengaged from the arm during its pivot.

A read/write device for read/write disks according to claim 7 of the invention comprises a magazine which can be opened and closed in the direction in which the disks are stacked and contains a plurality of holders each carrying a read/write disk in such a manner that the holders are capable of moving in the direction in which the disks are stacked; a main body of a read/write device having a magazine insertion section which permits the magazine to be inserted therein and removed therefrom; an open/close mechanism for opening and closing, in the direction in which the disks are stacked, the magazine which is in the magazine insertion section; a selecting means which is disposed to a side of the interior of the magazine insertion section so as to be movable in the direction in which the disks are stacked and selectively catches a holder carrying a read/write disk to be written or read from among the aforementioned holders in the magazine; an arm which is disposed to a side of the interior of the magazine insertion section so as to be movable in the direction in which the disks are stacked and also capable of moving towards and away from the magazine and has a driving system for rotating the read/write disk and also has a read/write head or a laser pickup for writing and/or reading data onto or from the read/write disk; an interlocking means for integrally moving the selecting means and the arm in the direction in which the disks are stacked in the magazine; and a driving means for integrally moving, through the interlocking means, the selecting means and the arm in the direction in which the disks are stacked in the magazine.

According to the configuration of a magazine for read/write disks as claimed in claim 1, by means of a connection supporting means for maintaining connection between the outer body and the inner body, the inner body and the outer body rotate in opposing directions parallel to the circumference of the disk and concurrently with their rotation move apart or together in the direction in which the disks are stacked, thus opening or closing. With the outer body and the inner body opening as above, a plurality of holders in the inner body become capable of moving in the direction in which the disks are stacked, permitting writing or reading of a read/write disk.

According to a method of reading and/or writing data from or onto read/write disks as claimed in claim 2, by using a magazine comprising an inner body and an outer body which move in opposing directions apart or together, thereby opening or closing while being constantly connected to each other, the inner body and the outer body are opened from a side without being completely disconnected, and at the same time desired disks from among a plurality of read/write disks disposed in a stack are moved in the direction in which the disks are stacked, thereby opening a space facing a read/write disk which is going to be read or written, and a read/write unit is advanced into the space so that the read/write disk may be rotated where it remains in a stack by a driving system of the read/write unit and read or written by a read/write head or a laser pickup without being pulled out of the magazine.

According to the configuration of a read/write device of a read/write disk as claimed in claim 3 of the invention, by using a magazine comprising an inner body and an outer body which move in opposing directions apart or together, thereby opening or closing while being constantly connected to each other, desired disks are selected from among a plurality of read/write disks in the magazine by means of a selecting mechanism, the inner body and the outer body of the magazine are released from each other by an open/close mechanism without being completely separated, and at the same time the read/write disks selected by the selecting mechanism from among the read/write disks stacked in the magazine are moved in the direction in which the disks are stacked, thereby opening a space facing a read/write disk which is going to be read or written, all of these functions being operated from a side of the magazine set in the magazine insertion section. Then, a read/write unit is inserted into the space, this function, too, being operated from a side of the magazine, and a read/write head or a laser pickup performs read-out or writing of the read/write disk facing the space while the disk is rotated by a driving system.

According to the configuration of a read/write device of a read/write disk as claimed in claim 4 of the invention, a magazine is inserted into the magazine insertion section of the main body of the read/write device, either the outer body or the inner body of the magazine becomes engaged with a catching portion of the slider. When opening the magazine in this state, by means of rotating the slider in one direction by a driving means, the outer body and the inner body are rotated in opposing directions parallel to the circumference of the disk and, together with their rotation, moved away from each other in the direction in which the disks are stacked so that the inner body and the outer body open. When closing the magazine, by means of rotating the slider in the other direction by the driving means, the outer body and the inner body are rotated in opposing directions parallel to the circumference of the disk and, together with their rotation, moved towards each other in the direction in which the disks are stacked so that the inner body and the outer body close.

According to the configuration of a read/write device of a read/write disk as claimed in claim 5 of the invention, when opening the magazine which has been inserted in the magazine insertion section of the main body of the read/write device to make the magazine ready for data reading or writing, by means of a selecting mechanism, a holder carrying a read/write disk to be written or read out is selected from among the holders and prevented from moving, and the outer body and the inner body are rotated in opposing directions parallel to the circumference of the disk by the open/close mechanism and, together with their rotation, moved away from each other in the direction in which the disks are stacked so that the inner body and the outer body open. As a result, the holders located lower than the holder engaged by the selecting mechanism descend under their own weight while rotating in the direction parallel to the circumference of the disk, thereby opening a space below the holder supported by the selecting mechanism to permit write/read function to be conducted. When closing the magazine, by the open/close mechanism, the outer body and the inner body are rotated in the respective directions parallel to the circumference of the disk and, together with their rotation, moved towards each other in the direction in which the disks are stacked so that the inner body and the outer body close. As a result, the holders which were lowered move in the direction parallel to the circumference of the disk towards the other holders, thereby closing the space for read/write function.

According to the configuration of a read/write device of a read/write disk as claimed in claim 6 of the invention, when the arm is at the retreated position, a catching portion of the driving mechanism catches one of the female parts of engagement formed in the arm, thereby holding the arm at its retreated position. On the other hand, while reading or writing of a disk is performed, the driving mechanism transmits the driving force from the driving means to the arm, thereby pivoting the arm from the retreated position to the read/write. At that time, through operation of the driving mechanism, the arm is released from engagement with the catching portion and permitted to pivot. When the arm has been pivoted from the read/write position, the catching portion of the driving mechanism catches the other female part of engagement of the arm, thereby holding the arm at its read/write position. In the same manner as above, when the arm is pivoted to the read/write position to the retreated position, operation of the driving mechanism releases the arm from engagement with the catching portion and permits it to pivot, and when the arm has been pivoted to the retreated position, the catching portion of the driving mechanism catches the first female part of engagement of the arm, thereby holding the arm at the retreated position.

According to the configuration of a read/write device of a read/write disk as claimed in claim 7 of the invention, by means of operating the driving means, the selecting means and the arm are united through an interlocking means and integrally move in the direction in which the disks are stacked so that selecting means selectively catches a holder carrying a read/write disk to be written or read from among a plurality of holders in the magazine and that the arm reaches the position corresponding to the position of the read/write disk to be written or read with respect to the direction in which the disks are stacked. By means of the open/close mechanism, the magazine is opened in the direction in which the disks are stacked. At that time, the holders contained in the removed part of the magazine move away from the holder engaged with the selecting means, forming a space in which the arm could be inserted. Then, the arm is inserted into the magazine, and data writing or reading of the read/write disk is performed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
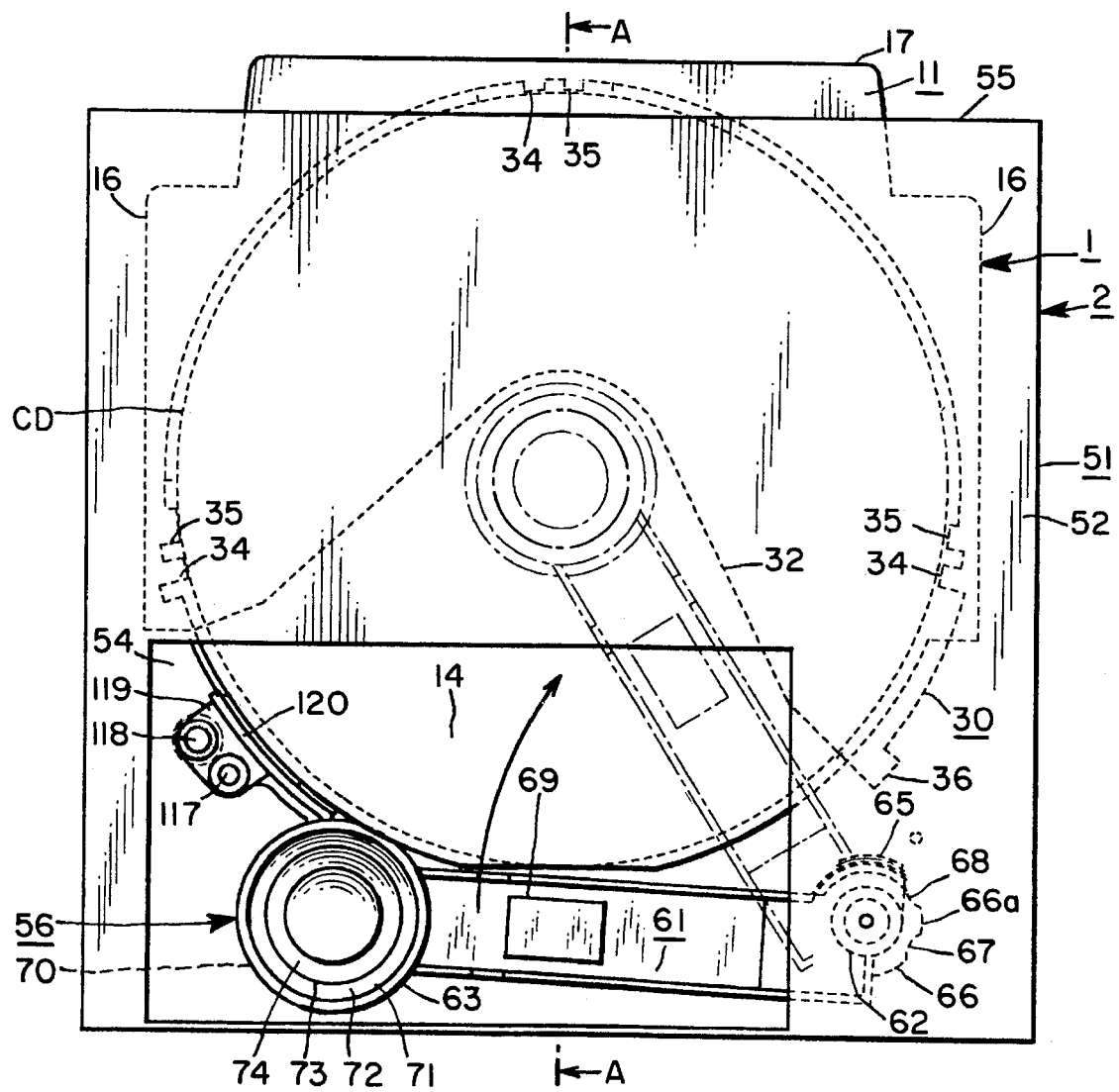
FIG. 1 is a top view of a changing device of an embodiment of a CD changer which utilizes the read/write method for read/write disks according to the present invention, FIG. 1 showing a changing device when a magazine is attached thereto.
Figure 2:
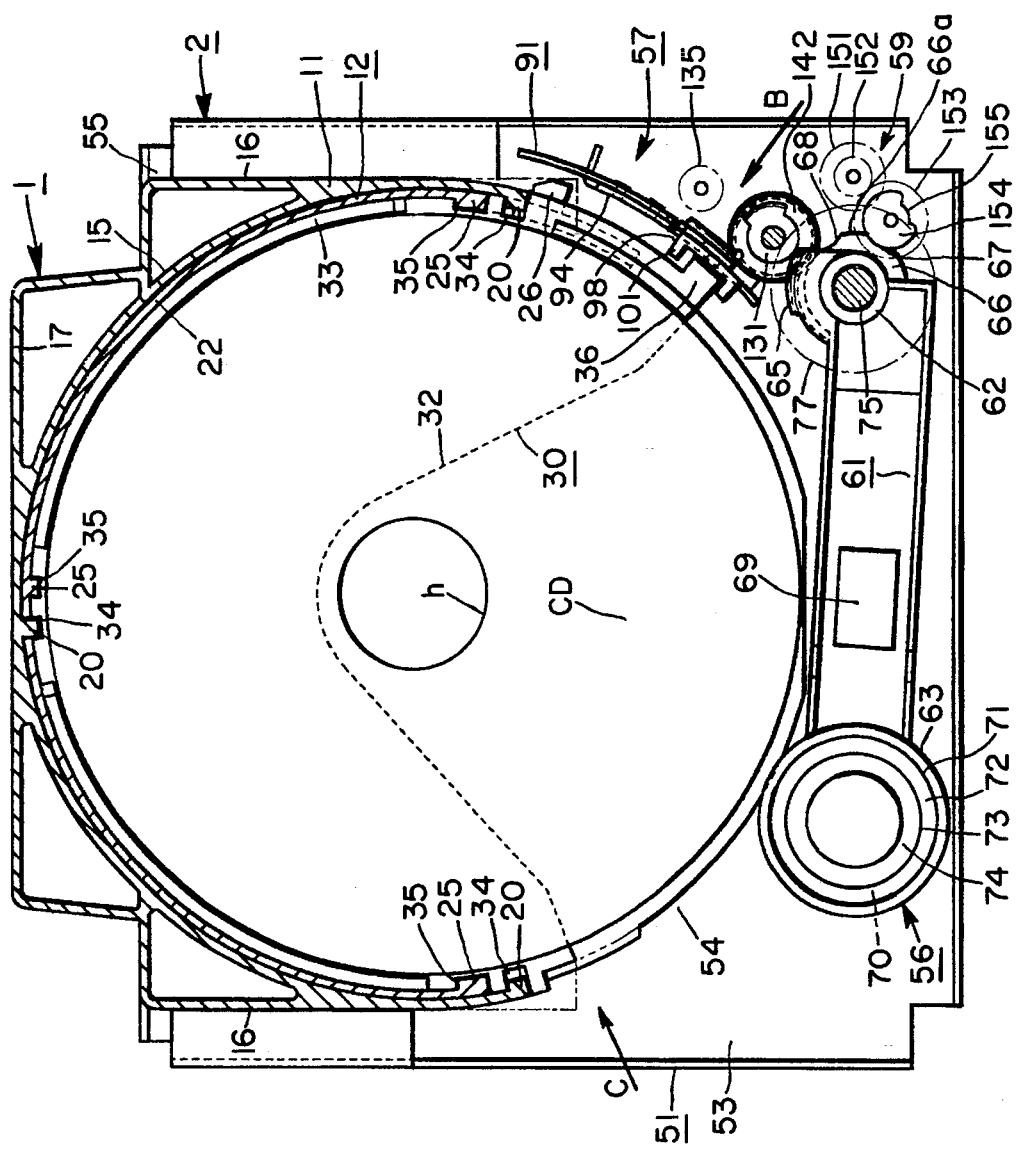
FIG. 2 is a sectional view of said changing device of the embodiment with the magazine attached thereto.
Figure 3:
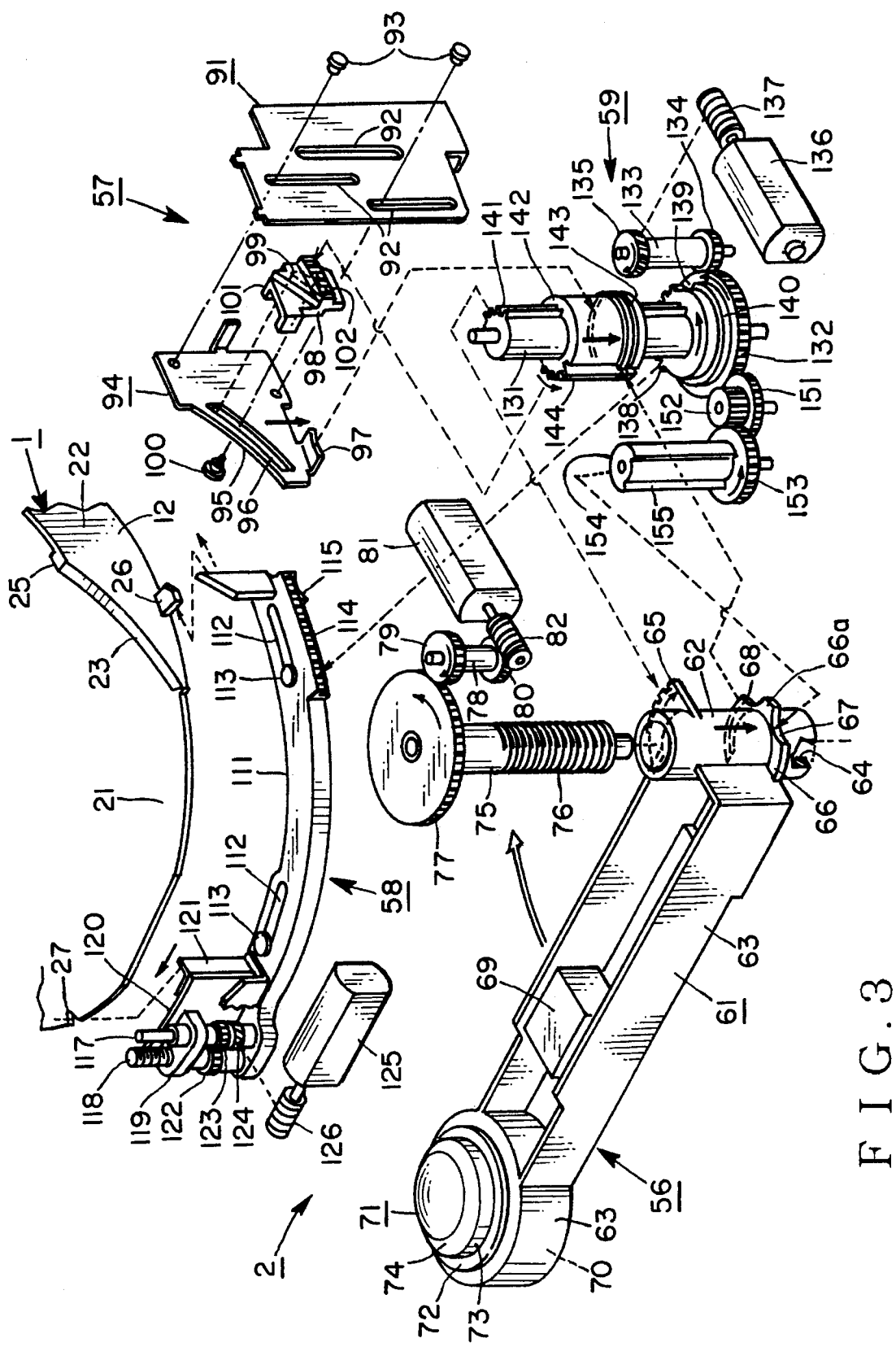
FIG. 3 is an exploded oblique view of a part of said changing device of the embodiment.
Figure 4:
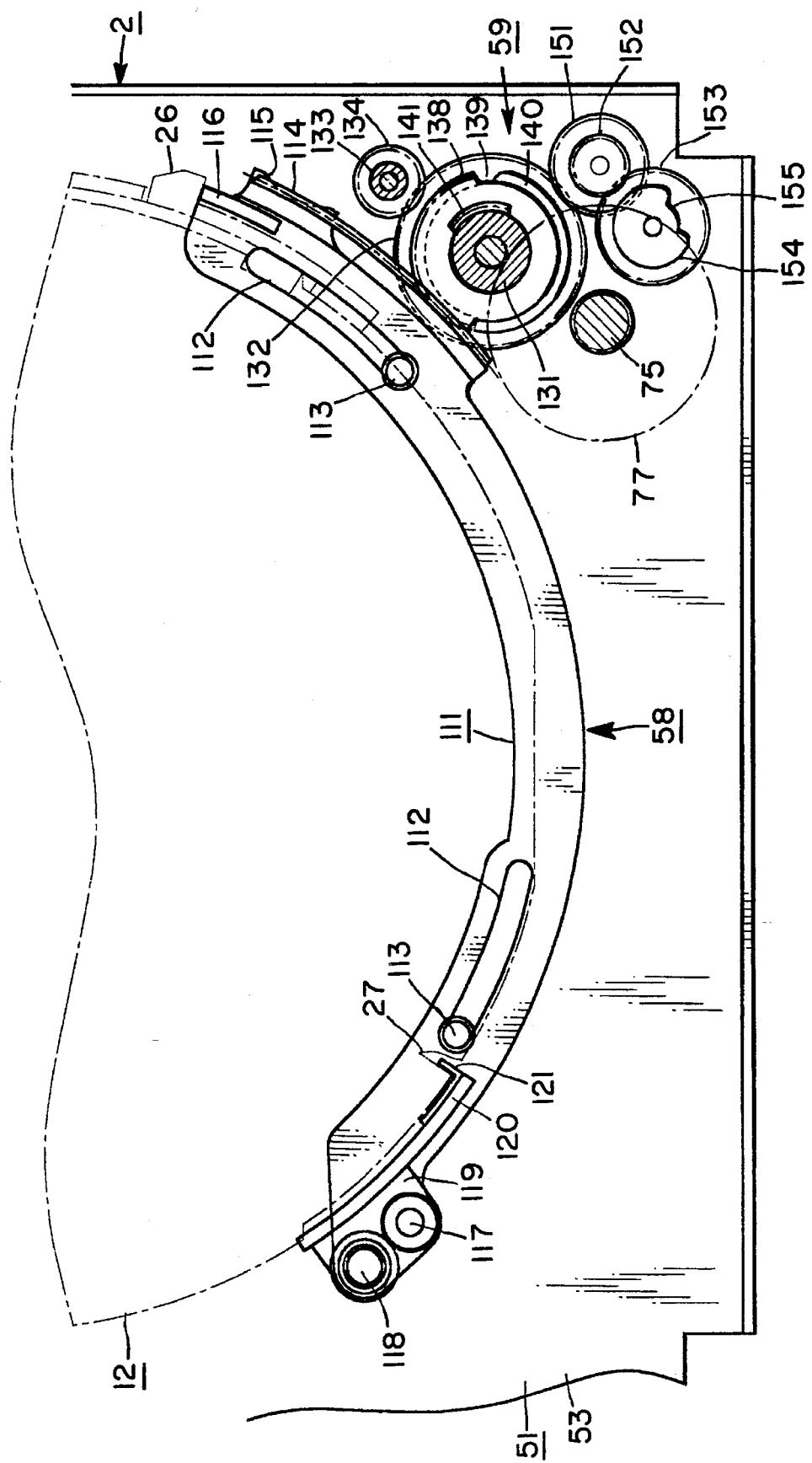
FIG. 4 is a sectional view of a part of same.
Figure 5:
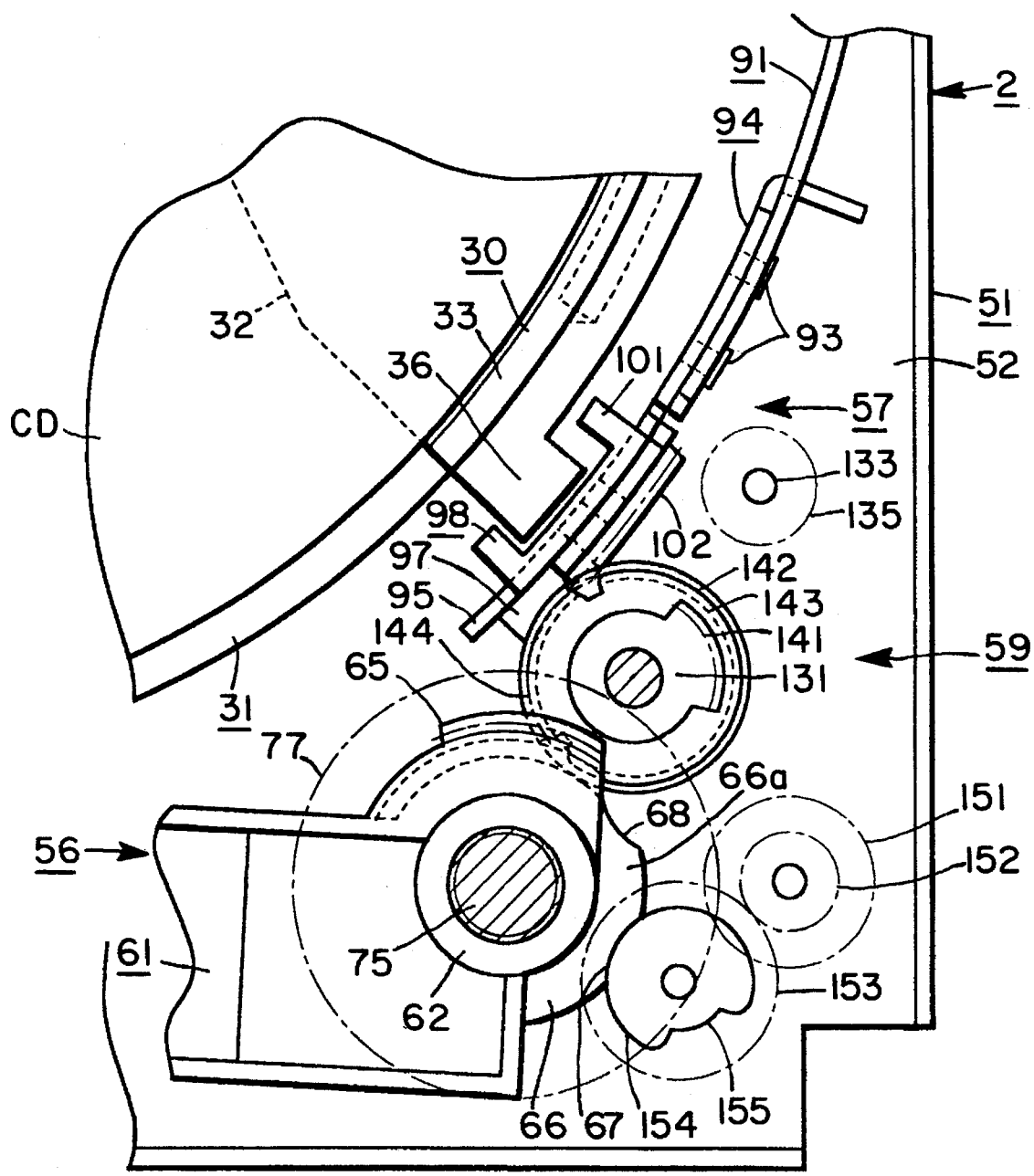
FIG. 5 is a sectional view of a part of same.
Figure 6:
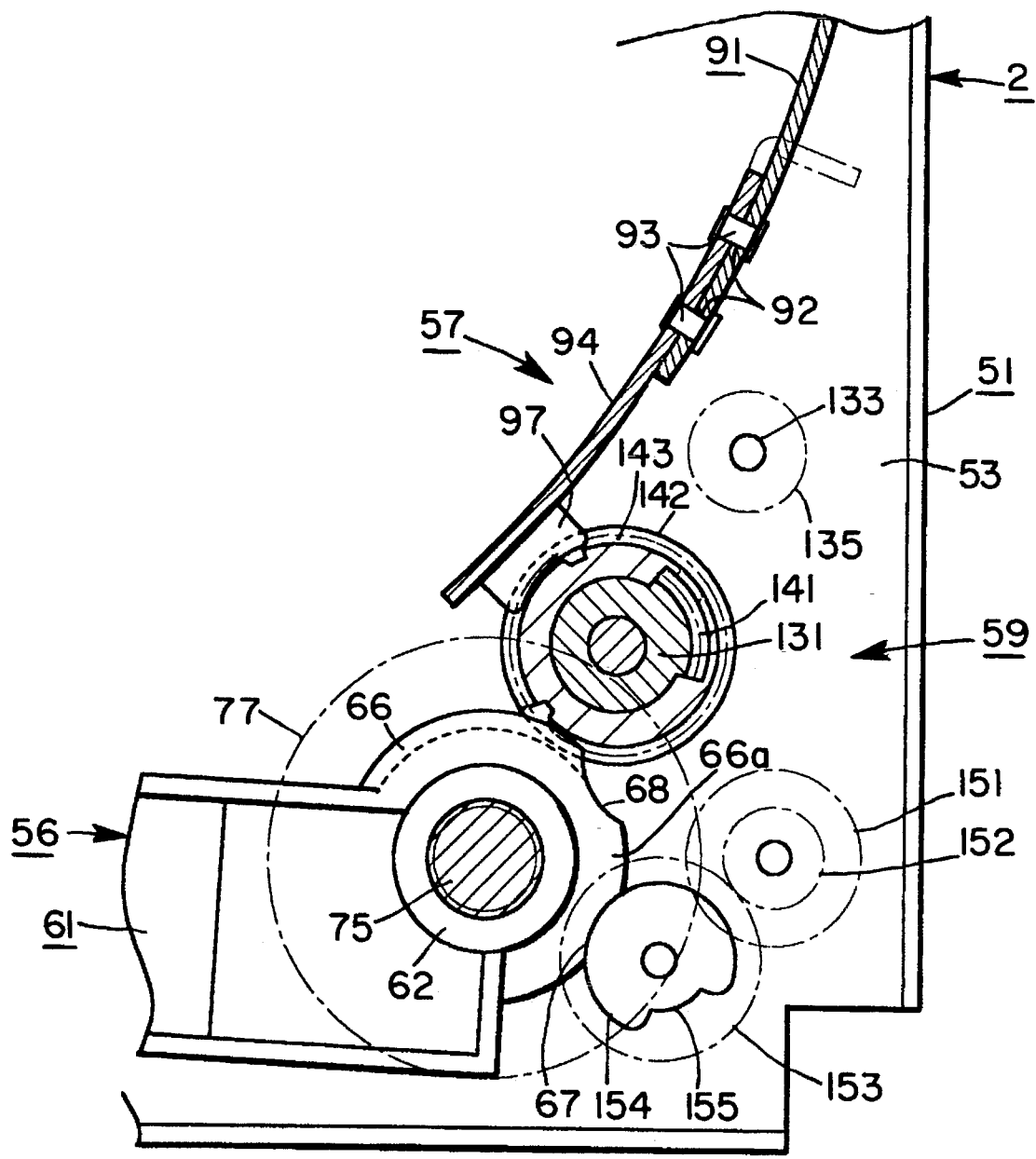
FIG. 6 is a sectional view of a part of same.

An embodiment of the present invention is explained hereunder, referring to the drawings.

In this embodiment a read/write disk referred to in the appended claims is a read-only compact disk (hereinafter referred to as a CD), and the explanation is given of a CD changer which handles CDs.

As shown in FIG. 1, a CD changer according to the embodiment consists of a magazine 1 for containing CDs therein and a changing device 2 which permits magazine 1 to be attached thereto and performs replay function.

Figure 7:
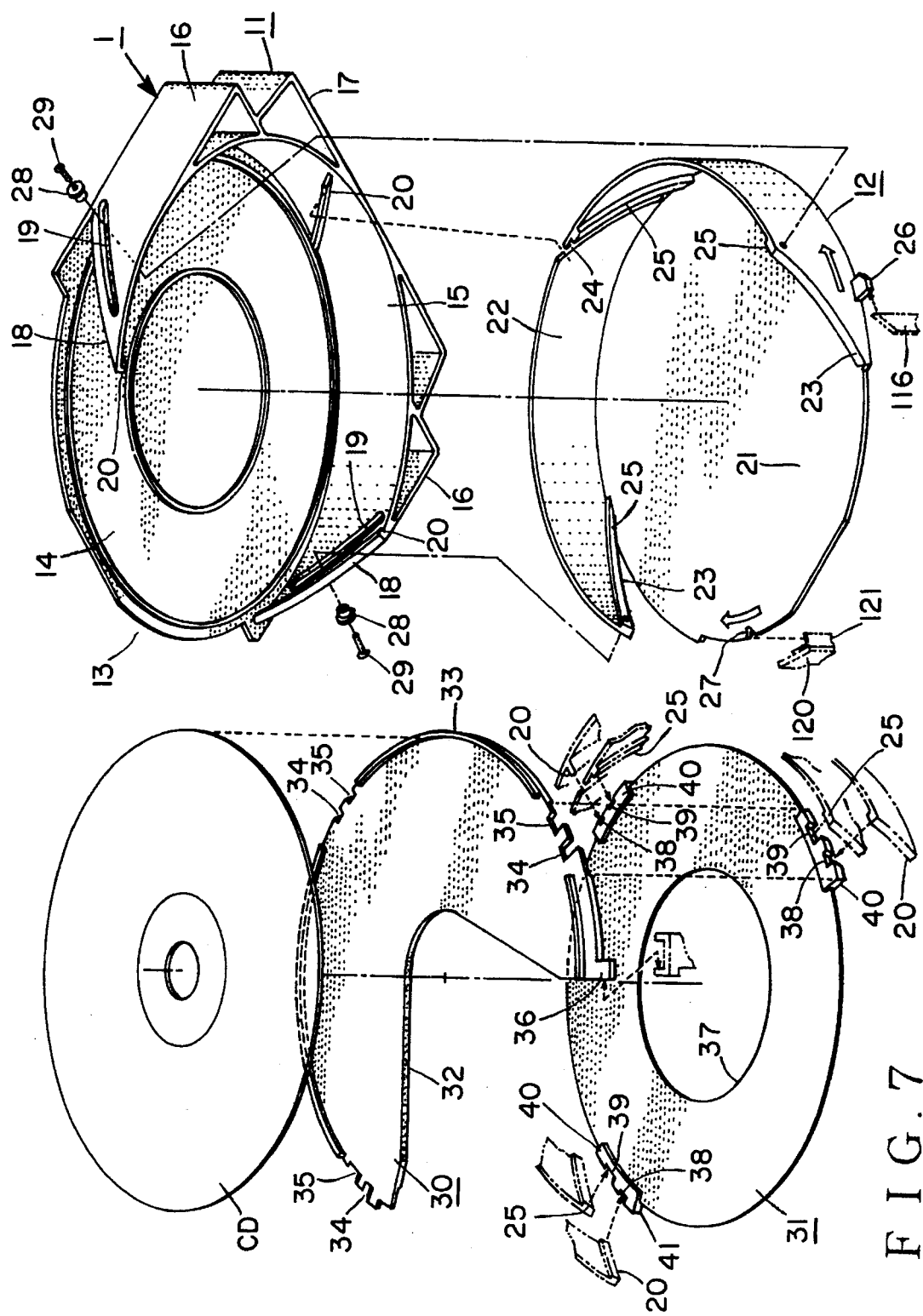
FIG. 7 is an exploded oblique view of a magazine of said embodiment.
Figure 8:
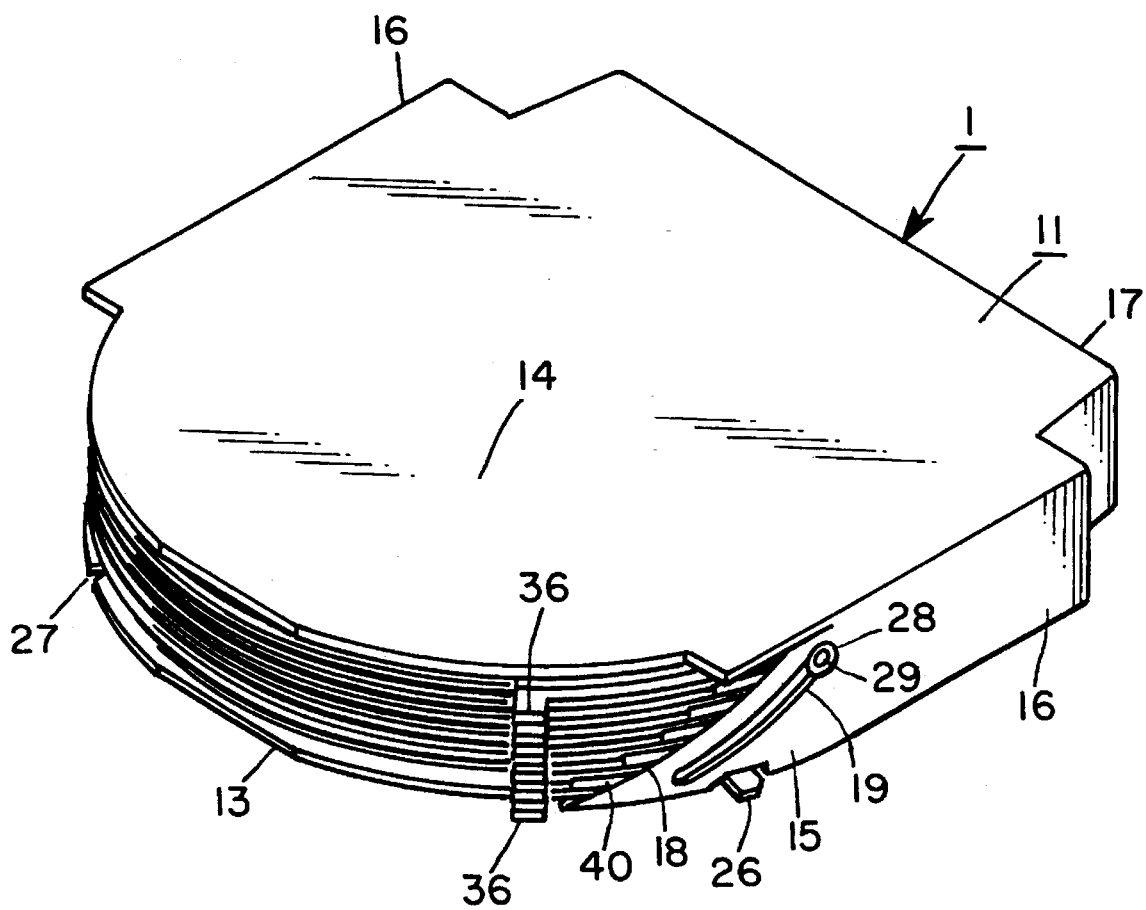
FIG. 8 is an oblique view of same.
Figure 9:
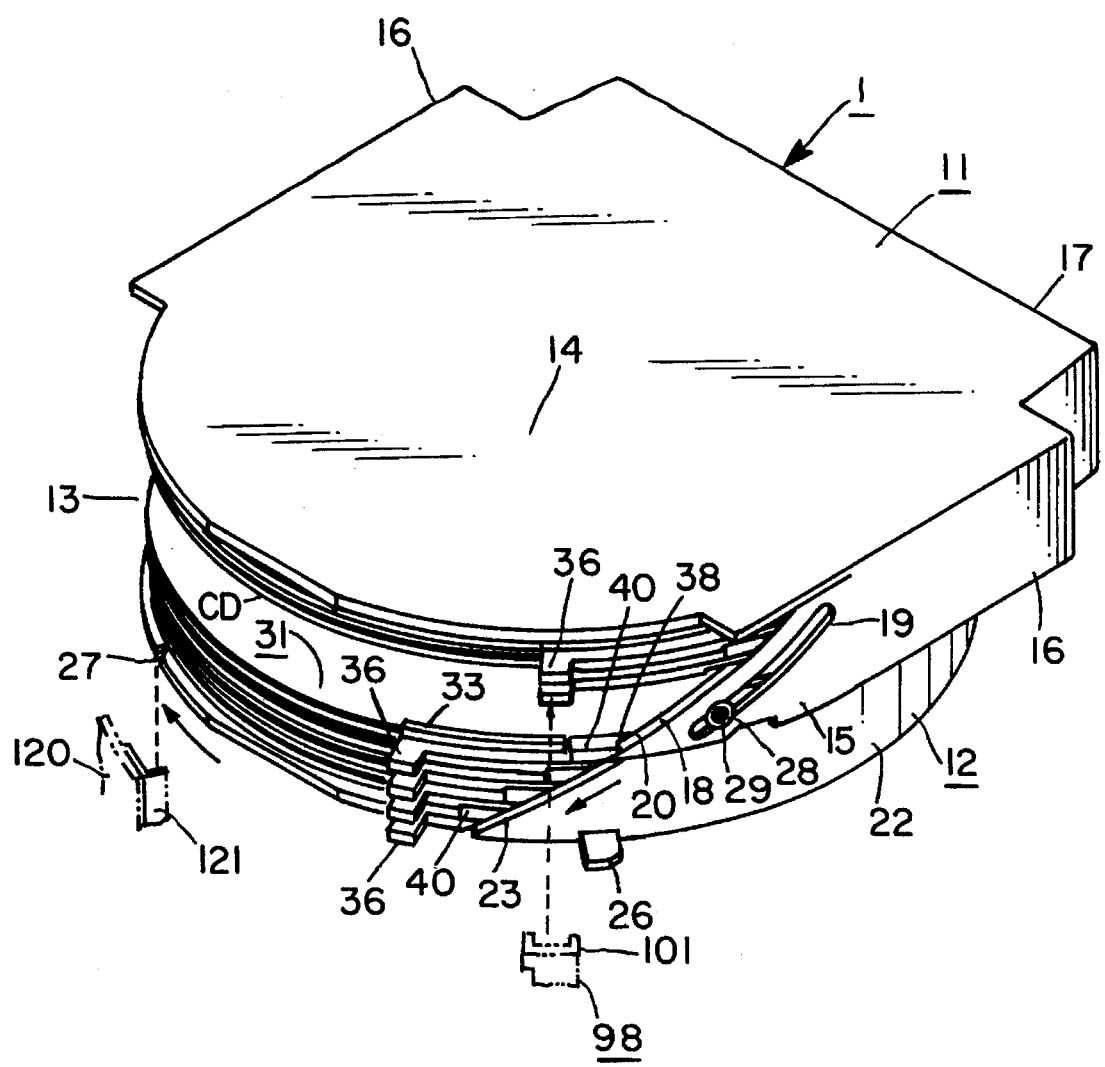
FIG. 9 is an oblique view of same when the device is in operation.
Figure 10:
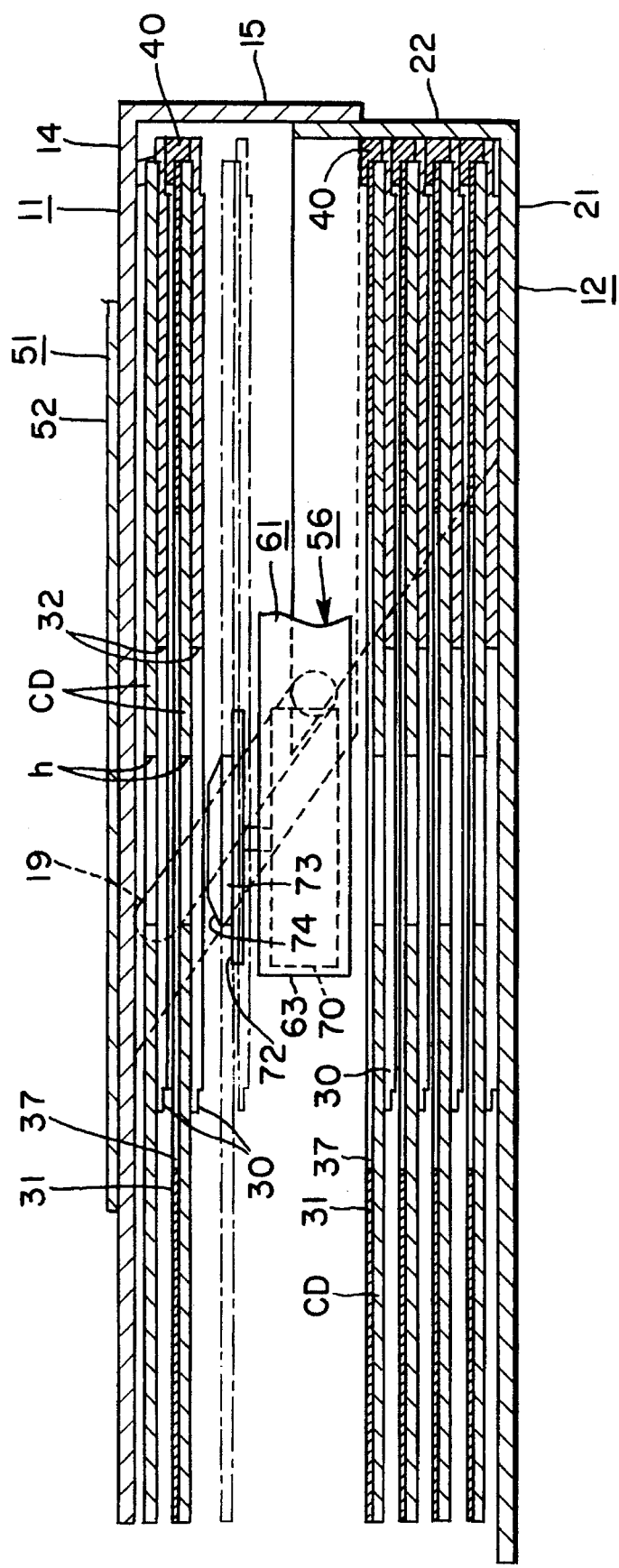
FIG. 10 is a sectional view of a part of said embodiment taken along the line A—A of FIG. 1.
Figure 11:
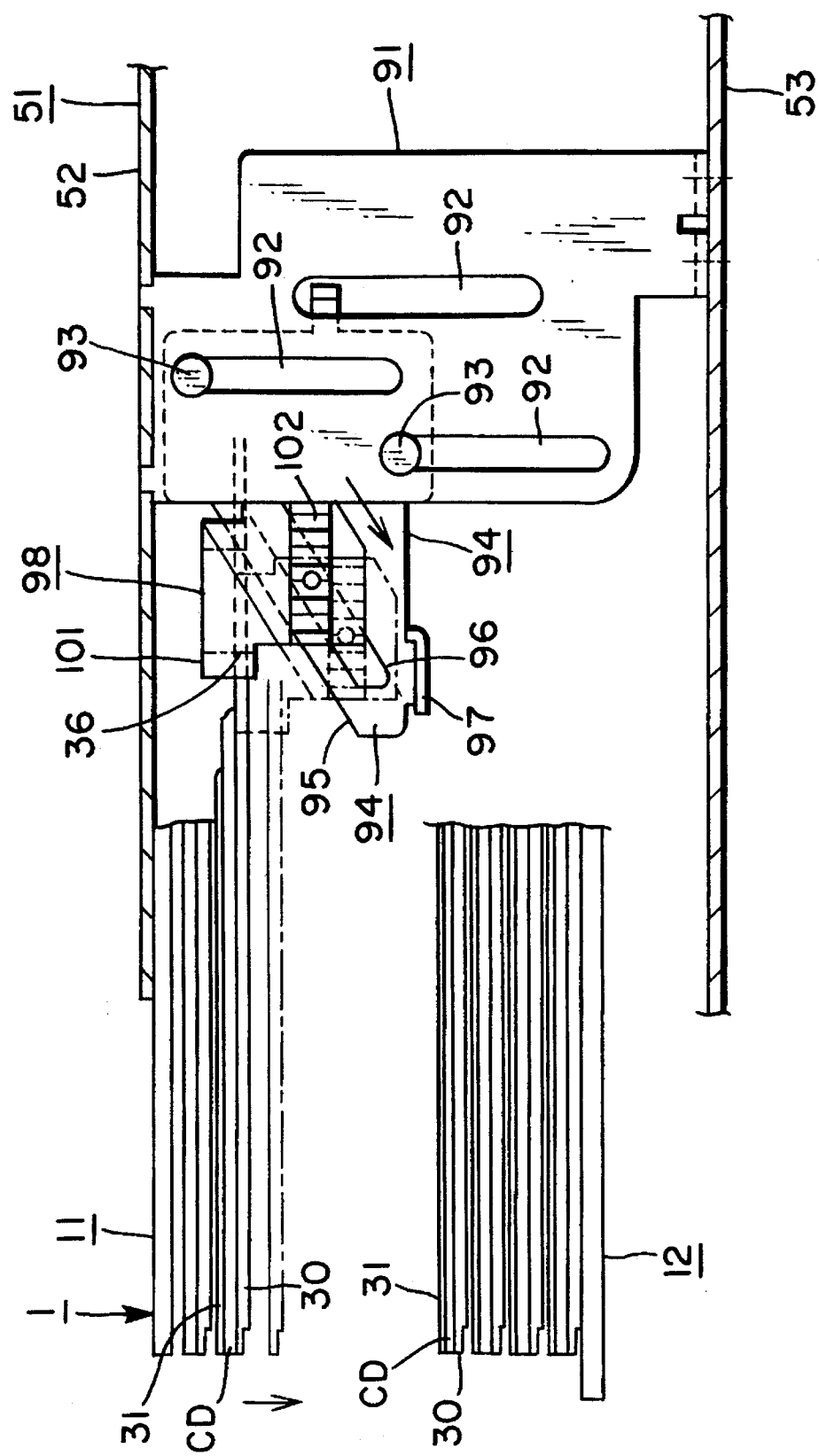
FIG. 11 illustrates the part of said embodiment when viewed from the direction indicated by arrow B of FIG. 2.

As shown in FIGS. 7 to 9, magazine 1 is provided with an outer body 11, inner body 12 and an opening 13 formed at the end which faces changing device 2 when the magazine is inserted into the changing device. In FIG. 7, the magazine is shown in its open state, with its outer body 11 having been turned around.

Outer body 11 comprises integrally formed various portions, such as a top plate portion 14, a round wall portion 15 so extending downward from the lower surface of top plate portion 14 as to form a circle except for opening 13, side wall portions 16 parallelly facing each other and located at both sides with the direction in which the magazine is inserted being regarded as forward, and an end wall 17 opposite the front end of the magazine. Each end of round wall portion 15 which defines opening 13 is formed into an inclined edge 18 slanting downward to the left and a guide groove 19 is formed parallel to each inclined edge 18. Three inclined ridges 20 which have the same inclination as inclined edges 18 and project inward are formed on the inner surface of round wall portion 15: one each on the inside of each inclined edge 18 and at a position across opening 13.

Inner body 12 comprises such integrally formed pans as an approximately circular bottom plate portion 21 and a round wall portion 22 so extending upward from the edge of bottom plate portion 21 as to form a circle except for opening 13. Each end of round wall portion 22 forming opening 13 is an inclined edge 23 slanting downward to the left at the same angle as the aforementioned inclined edges 18, and a guide groove 24 is formed in the part of round wall portion 22 across opening 13, at such a position as to permit inclined ridge 20 to be engaged therein. Three inclined ridges 25 which have the same inclination as inclined edges 23 are formed on the inner surface of round wall portion 22: one each on the inside of each inclined edge 23 and along guide groove 24. A lever portion 26 is formed at one end of round wall portion 22, protruding outward from the outer surface of the wound wall portion. Further, a part of the edge of bottom plate portion 21, i.e. the edge defining opening 13, is notched to form a catching recess 27.

Inner body 12 is fitted in outer body 11 with inclined ridge 20 being slidably caught in guide groove 24 and a screw 29 being screwed to inner body 12 through a sliding member 28 which is slidably caught in guide groove 19 of outer body 11. Because of slidable engagement with these inclined members, screw 29 and sliding member 28 move downward when inner body 12 rotates clockwise with respect to outer body 11 and upward when inner body 12 rotates counterclockwise. Sliding member 28 and screw 29 together constitute the connection supporting means referred to in the appended claims.

A plurality of holders 30 and separators 31 are stacked between outer body 11 and inner body 12, each holder 30 being capable of supporting one CD thereon and each separator 31 being sandwiched between two holders.

Each holder 30 is in the shape of a disk having a wedge-shaped cutout portion 32 formed at a position corresponding to opening 13, and a support wall 33 to hold the rim of a CD loaded on the holder is formed around the edge of the top of the holder and protrudes upward. A pair of concaves 34/35 are formed at three locations around the edge of holder 30 so that the aforementioned inclined ridges 20/25 are capable of being respectively engaged in corresponding concaves 34/35. A lever portion 36 protruding outward is formed at one end of the rim of holder 30, where it is connected to cutout portion 32. As shown in FIG. 8, lever 36 of each holder 30 is positioned in such a manner that all the levers align vertically when the magazine is closed.

Figure 12:
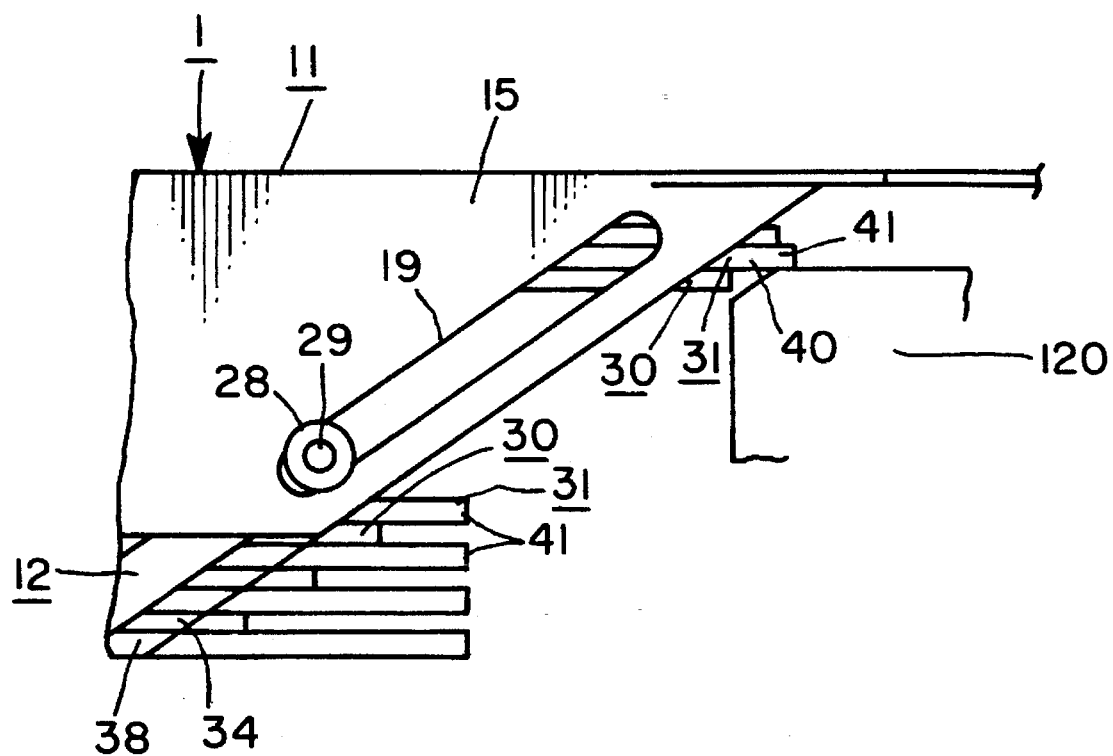
FIG. 12 illustrates the part of said embodiment seen from the direction indicated by arrow C of FIG. 2.

Each separator 31 is in the shape of a disk having a hole 37 at the center, and three guide members 40 are attached to each separator 31, one each at three locations around the rim of the separator. Each guide member 40 has concaves 38 and 39 which are formed at such locations as to permit corresponding inclined ridges 20/25 to be respectively engaged therein. Guide members 40 located at the other end of opening 13, in other words the end opposite the end adjacent to lever 36, are positioned in such a manner that their respective edges 41 align vertically as shown in FIG. 12 when the magazine is closed.

As shown in FIG. 9, by means of rotating holders 30 which are located below holder 30 that supports a selected CD counterclockwise together with inner body 12, said lower holders 30 are lowered in clockwise rotation. As a result, a space is formed between upper holders 30 and lower holders 30, permitting read-out of the selected CD to be conducted through the space. In the state where magazine 1 is thus open, levers 36 of lower holders 30 move downward to the left with respect to the positions of levers 36 of holders 30 which remain at a standstill, whereas edges 41 of lower separators 31 move downward to the left with respect to the positions of edges 41 of separators 31 which remain at a standstill.

As shown in FIGS. 1 to 6, changing device 2 includes a case 51 which serves as the main body of the read/write device referred to in the claims. Case 51 is in the shape of an approximately square frame slightly larger than magazine 1 and is provided with a magazine insertion section 54 between upper case 52 and lower case 53, and an insertion opening 55 through which magazine 1 may be inserted in and removed from the device is formed at a side of magazine insertion section 54.

Provided in case 51 are a read/write unit 56 which is disposed in the back of magazine insertion section 54 and performs read-out of CDs, a selecting unit 57 which is disposed to a side within the interior of magazine insertion section 54 and serves as the selecting mechanisms for selecting a CD to be played, an open/close unit 58 which is disposed in the lower portion in the back of the interior of magazine insertion section 54 and serves as the open/close mechanism for opening and closing magazine 1, and a driving unit 59 which serves as the driving mechanism for driving selecting unit 57 and open/close unit 58.

Read/write unit 56 has an arm 61 having an approximately U-shaped section with the open top, arm 61 having at one of its ends a cylindrical portion 62, which serves as the center of rotation, and at the other end a holding portion 63.

Cylindrical portion 62 is provided with screw threads 64 formed along the inside of cylindrical portion 62, a wedge-shaped gear portion 65 projecting from the upper part of the outer surface, and a rib 66 projecting from the lower part of the outer surface. Rib 66 has recesses 67 and 68 which respectively serve as the female part of engagement for determining the stand-by position and the playback position.

Disposed inside arm 61 is a laser pickup 69, which is capable of being moved along arm 61 by means of, for example, a delivery motor and performing read-out function by emitting laser light upward and receiving the light reflected by the CD.

Holding portion 63 has a motor 70 serving as a driving system and a clamp 71 rotated by motor 70, motor 70 being incorporated in the lower part of holding portion 63 and clamp 71 disposed on top of holding portion 63. Clamp 71 is provided with a supporting portion 72, which supports the underside of the rim of hole h of a CD, and a boss 73 which is inserted through hole h. A tapered portion 74 for guiding hole h to boss 73 is formed around the upper part of boss 73 so that a clamp member which is capable of catching the top lip of hole h projects from boss 73 and clams holding portion 63 and the CD together when boss 73 is fitted in hole h.

A threaded shaft 75 serving as a supporting shaft is vertically and rotatably disposed in case 51. Cylindrical portion 62 of arm 61 is fitted around threaded shaft 75, with screw threads 64 of cylindrical portion 62 being screwed around male screw 76 of threaded shaft 75. Formed at the upper end of threaded shaft 75 is a gear 77, which is interlocked with a gear 79 of a gear shaft 78 rotatably attached to upper case 52. Gear shaft 78 also has a gear 80, which is interlocked with a worm gear 82 of a motor 81 that is attached to upper case 52 and serves as a driving means. Therefore, through forward or reverse operation of motor 81, threaded shaft 75 rotates in the forward or reverse direction, thereby moving read/write unit 56 up or down.

Selecting unit 57 has a bracket 91 which is vertically disposed in case 51 and provided with a plurality of guide grooves 92 vertically formed therein. A sliding plate 94 which constitutes a part of the interlocking member referred to in the claims is attached to bracket 91 with fasteners 93 which are capable of slidably fitting in respective guide grooves 92 in such a manner that sliding plate 94 is capable of sliding up and down. Sliding plate 94 has an inclined edge 95 inclined at the same angle as inclined edge 23 of magazine 1 and the other aforementioned inclined edges. Sliding plate 94 is also provided with a guide groove 96, which is formed inward from inclined edge 95, and a catching piece 97 projecting from the lower front corner of the plate, where the lower end of guide groove 96 is located, towards driving unit 59. Bracket 91 and sliding plate 94 are curved to fit along the curved shape of magazine 1.

A selecting member 98 serving as the selecting means is disposed outside sliding plate 94. With a sliding portion 99 which is capable of fitting in guide groove 96 being formed thereon as to protrude therefrom, selecting member 98 is attached to sliding plate 94 by means of affixing a fastener 100, which is capable of slidably catching the inner side of sliding plate 94, to sliding portion 99 so that selecting member 98 is capable of diagonally sliding along guide groove 96. Selecting member 98 has a supporting frame 101 which has an approximately U-shaped section and is so formed as to project inward over the top of inclined edge 95 of sliding plate 94 and fit around lever portion 26 of magazine 1, sandwiching lever portion 26. Furthermore, a gear portion 102 is formed on the outer side of selecting member 98.

Open/close unit 58 has an arc-shaped slider 111 corresponding to the curved face of magazine 1, i.e. the portion defining opening 13. Slider 111 is attached to the upper surface of lower case 53 with fasteners 113 in such a manner that slider 111 is capable of freely sliding in a direction parallel to the curved edge of the magazine, fasteners 113 respectively fitted in a pair of grooves 112 formed in slider 111, near the ends thereof.

A gear portion 114 is formed at an end of slider 111, more precisely on the outer rim of the end portion, and a recess 115 for determining the open position is formed at the bottom of gear portion 114. Slider 111 is also provided with a protruding portion 116 which vertically protrudes from the upper surface of said end portion, protruding portion 116 being capable of catching lever portion 26 of magazine 1 and thus serving as a catching portion referred to in the appended claims.

Provided at the other end of slider 111 are a supporting shaft 117 vertically disposed on the slider, a threaded shaft 118 vertically and rotatably disposed on same and an elevating plate 120 having an attachment 119 which is slidably fitted around supporting shaft 117 and screwed around threaded shaft 118. An approximately L-shaped catching piece 121 which extends in the vertical direction and is capable of being engaged in catching recess 27 of inner body 12 of magazine 1 is attached to elevating plate 120, catching piece 121 serving as a catching portion referred to in the appended claims. Affixed to threaded shaft 118 is a gear 122, which is engaged with a gear 123 rotatably provided around supporting shaft 117. A worm gear 126 of a motor 125 attached to slider 111 is engaged with a gear 124 which rotates integrally with gear 123. Therefore, through forward or reverse operation of motor 125, threaded shaft 118 rotates in the forward or reverse direction, thereby moving elevating plate 120 and catching piece 121 up or down.

Driving unit 59 has a shaft 131 which is vertically and rotatably disposed in case 51. Formed around the lower part of shaft 131 is a gear 132, which is engaged with a gear 134 of a gear shaft 133 rotatably attached to lower case 53. A worm gear 137 of a motor 136 serving as a driving means and attached to lower case 53 is engaged with a gear 135 of gear shaft 133. Therefore, through forward or reverse operation of motor 136, shaft 131 rotates in the forward direction (the direction represented by an arrow in FIG. 3) or the reverse direction.

Formed above gear 132 of shaft 131 is a gear portion 138, which is capable of catching gear portion 114 of slider 111, gear portion 138 being formed only within a specified angle range in which gear portion 138 may be engaged with gear portion 114. A disk-shaped cam 140 having a cutout portion 139 at the position corresponding to where gear portion 138 protrudes is also formed above gear 132.

A gear portion 141 which is capable of being engaged with gear portion 65 of arm 61 is formed above gear portion 138 of shaft 131, more precisely near the end of forward rotation of gear portion 138, gear portion 141 extending along the total axial length of the portion of shaft 131.

A tube-shaped cylinder 142 which constitutes a part of an interlocking member is fitted around shaft 131 in such a manner that cylinder 142 is located above gear portion 138 and capable of sliding up and down together with gear portion 141. Cylinder 142 has a groove 143, which is formed around the wall of cylinder 142, near the bottom thereof, and permits rib 66 of arm 61 and catching piece 97 of sliding plate 94 to be caught therein, and a gear portion 144, which is formed at a location opposite gear portion 141 and is capable of catching gear portion 102 of selecting member 98. As a result of this configuration, arm 61 vertically moves together with sliding plate 94 through cylinder 142.

A gear 151 vertically and rotatably disposed in lower case 53 is engaged with gear portion 132 of shaft 131, a gear 152 which works integrally with gear 151 is engaged with a gear 153 which is vertically and rotatably disposed in lower case 53 at a position adjacent to threaded shaft 75 of arm 61, and a cam shaft 154 serving as a catching portion is formed on gear 153 as an integral body therewith. The round wall of cam shaft 154 is capable of being engaged in recess 67 or recess 68 of rib 66 of arm 61. Cam shaft 154 is also provided with a cutout portion 155, which is formed in the wall of cam shaft 154 so as to face rib 66, thereby permitting arm 61 to pivot when arm 61 is moved to pivot.

Next, the function of the present embodiment is explained.

When changing device 2 is in the stand-by mode (FIGS. 1 to 6 illustrate the device in the stand-by mode), arm 61 of its read/write unit 56 is in its retreated position deep inside magazine insertion portion 54 and locked at the retreated position, with the wall of cam shaft 154 being caught in recess 67 of arm 61 and the height of the arm maintained at the top, the bottom, the middle or the same height as that during the previous replay mode. The end of selecting member 98 is in contact with the wall of cylinder 142, selecting member 98 thus being prevented from moving further and located at the highest point of guide groove 96 of sliding plate 94. Slider 111 has been rotated counterclockwise as shown in the drawings to its fullest limit, and gear portion 138 of shaft 131 is engaged with gear portion 114 and held in this state. Elevating plate 120 and catching piece 121 are at their lowest positions.

When setting magazine 1, insert CDs through opening 13 and place them on respective holders 30 of magazine 1 with the recorded side of each CD facing down, and then insert magazine 1 through insertion opening 55 of changing device 2 into magazine insertion section 54, with opening 13 head-first.

When magazine 1 is completely inserted in changing device 2, lever portion 26 of magazine 1 fits in supporting frame 101 of selecting member 98, catching recess 27 of inner body 12 of magazine 1 catches catching piece 121 of slider 111, and lever portion 26 faces protruding portion 116 of slider 111.

When a user operates the controlling device that controls changing device 2 to select the CD loaded on one of holders 30, elevating motor 81 rotates in the forward or the reverse direction so that arm 61 of read/write unit 56 ascends or descends to move to a position slightly lower than holder 30 which carries the selected CD. Together with this movement of arm 61, sliding plate 94 integrated with arm 61 through cylinder 142 moves vertically to a height such that supporting frame 101 of selecting member 98 that moves integrally with sliding plate 94 catches lever portion 36 of holder 30 carrying the selected CD.

Thereafter, motor 136 is driven in the forward direction, thereby initiating forward rotation of shaft 131.

At the beginning of the forward rotation of shaft 13 1, slider 111 slides clockwise along the curved edge of the magazine through engagement of gear portion 138 of shaft 131 with gear portion 114 of slider 111, inner body 12 of magazine 1 engaged with catching piece 121 of slider 111 descends in clockwise rotation together with the slider. At the same time, holders 30 and separators 31 located below holder 30 which is prevented from rotating due to engagement with supporting from 101 of selecting member 98 descend while rotating clockwise together with inner body 12.

When shaft 131 has rotated by a specified angle, gear portion 138 of shaft 131 becomes disengaged from gear portion 114 of slider 111, and cam 140 of shaft 131 fits in recess 115 of slider 111, thereby preventing slider 111 from sliding further.

As a result, a space is formed below holder 30 that carries the selected CD, permitting read/write unit 56 to advance into this space.

While lever portions 36 of holders 30 lowered with respect to the position of lever portion 36 of holder 30 which is held by selecting member 98 are lowered in clockwise rotation, edges 41 of lower separators 31 moved downward with respect to the position of edge 41 of separator 31 which is on holder 30 held by selecting member 98 are lowered in clockwise rotation. A part of elevating plate 120 of slider 111 is located below edge 41 of separator 31 which is on holder 30 held by selecting member 98.

At the beginning of the forward rotation of shaft 131, cam shaft 154 rotates counterclockwise as viewed in the drawings, and cutout portion 155 comes to face a rib 66a between recesses 67/68 of rib 66 of arm 61.

Then, during the middle stage of the forward rotation of shaft 131, gear portion 141 of shaft 131 is interlocked with gear portion 65 of arm 61 so that arm 61 advances into the space formed in magazine 1 as it pivots counterclockwise as viewed in the drawings. At that time, as cutout portion 155 of cam shaft 154 faces rib 66a between recesses 67/68 of arm 61, arm 61 is released and permitted to pivot.

When holding portion 63 at the front end of arm 61 reaches the center of magazine 1, i. e. the center of the CDs, gear portion 141 of shaft 131 becomes disengaged from gear portion 65 of arm 61, and the wall of cam shaft 154 catches recess 68 of arm 61, thereby locking arm 61 at the read position.

During the middle stage of the forward rotation of shaft 13 1, motor 125 is driven in the forward direction, and elevating plate 120 moves upward so that the top of elevating plate 120 comes into contact with edge 41 of separator 31 disposed on holder 30 which is supported by selecting member 98, thereby preventing downward movement of the separator.

During the last stage of the forward rotation of shaft 131, gear portion 144 of cylinder 142 which is fitted around shaft 131 catches gear portion 102 of selecting member 98, selecting member 98 moves down in clockwise rotation along guide groove 96 of sliding plate 94, and. holder 30 whose lever portion 36 is supported by supporting frame 101 of selecting member 98 also moves down while rotating clockwise. At that time, as holder 30 is provided with cutout portion 32, holder 30 moves without abutting against arm 61.

As a result, the CD loaded on holder 30 moves down with the holder. During this downward movement, hole h of the CD passes through tapered portion 74 and fits around boss 73 of clamp 71, the CD thus rested on supporting portion 72, and the forward drive of motor 136 is terminated when holder 30 has been further lowered. At that time, as separator 31 located above the descending holder 30 is prevented by elevating plate 120 from descending, CD is separated from both lower holder 30 and upper separator 31.

Then, by means of clamping CD with clamp 71, the device becomes ready for playback. As motor 70 is actuated, CD rotates with clamp 71, and laser pickup 69 moves in arm 61 and performs readout and playback of signals recorded on the CD.

The steps to return the device to the stand-by mode and remove magazine 1 after the CD has been played starts with releasing the CD from clamping by clamp 71 and then reversing motor 136 so that shaft 131 begins to rotate in the reverse direction.

In the beginning of the reverse rotation of shaft 131, as gear portion 144 of cylinder 142 fitted around shaft 131 is engaged with gear portion 102 of selecting member 98, selecting member 98 ascends while rotating counterclockwise along guide groove 96 of sliding plate 94, thereby permitting holder 30 whose lever 36 is supported by supporting frame 101 of selecting member 98 to ascend while rotating clockwise.

Holder 30 pushes up the CD during its ascend, removing hole h of the CD from boss 73 of clamp 71, and moves on upward together with the CD thereon.

Then, when gear portion 144 of cylinder 142 becomes disengaged from gear portion 102 of selecting member 98, the wall of cylinder 142 comes into contact with selecting member 98, thereby holding selecting member 98 at its raised position.

Next, during the middle stage of the reverse rotation of shaft 131, motor 125 is driven in the reverse direction so that elevating plate 120 descends and retreats.

Gear portion 141 of shaft 131 becomes engaged with gear portion 65 of arm 61, and arm 61 therefore pivots counterclockwise as viewed in the drawing and retreats from the space formed between the upper part and the lower part of magazine 1. At that time, as cutout portion 155 of cam shaft 154 faces rib 66a between recesses 67/68 of arm 61, arm 61 is released and permitted to pivot.

When arm 61 reaches the initial stand-by position, gear portion 141 of shaft 131 becomes disengaged from gear portion 65 of arm 61, whereas the wall of cam shaft 154 becomes engaged in recess 67 of arm 61, locking arm 61 at the stand-by position.

Next, during the last stage of the reverse rotation of shaft 131, cam portion 140 of shaft 131 becomes disengaged from recess 115 of slider 111, thereby permitting cutout portion 139 to face slider 111 and releasing arm 61, and gear portion 138 of shaft 131 catches gear portion 114 of slider 111, permitting slider 111 to slide counterclockwise in the direction of the curve. As protruding portion 116 of slider 111 pushes lever portion 26 of inner body 12 of magazine 1, inner body 12, together with the CDs and holders 30 which have been at their lowered positions, moves upward while rotating counterclockwise. As a result, the space formed in magazine 1 is closed.

When slider 111 has returned to its initial position, the reverse rotation of motor 136 is terminated, returning the device to the initial stand-by mode. In this condition, magazine 1 can be pulled out of changing device 2.

When changing CDs to be played, return arm 61 to the stand-by position, and also return magazine 1 to the stand-by state, where it is closed. Then, by means driving elevating motor 81 in the forward or the reverse direction, the positions of read/write unit 56 and selecting member 98 are adjusted with respect to the height of holder 30 carrying the CD which is going to be played. Thus, the mode of the device is switched from the stand-by mode to the playback mode, where the device is ready to play the selected CD.

As described above, by means of moving any one of a plurality of CDs loaded in a stack in the direction in which the disks are stacked, forming a space which faces the CD to be played and inserting read/write unit 56 into this space, it is possible to rotate and perform read out of the CD by using read/write unit 56 while the CD is still in the stack. Thus, the present invention is capable of reducing the size of the changing device.

Therefore, in cases where a device according to the invention is used as a multiple-disk CD changer - for example a six-disk CD changer - for an automobile, it is possible to integrate a changing device 2 into the center of the instrument panel.

Furthermore, as magazine 1 can be opened and closed in such a manner that outer body 11 and inner body 12 are rotated in opposing directions parallel to the circumference of the disk to be moved apart or together in the direction in which the disks are stacked, while being always connected by a connection supporting means which is comprised of a sliding member 28, a screw 29 and the like provided at a side of magazine 1 where outer body 11 and inner body 12 overlap each other, the present invention ensures, with a simple configuration, stable opening and closing of outer body 11 and inner body 12 and is capable of increasing a number of read/write disks to be contained in the magazine within a specified vertical dimension.

As slider 111 engaged with inner body 12 is rotated in one direction or the other by using magazine 1, which has a structure such that outer body 11 and inner body 12 are rotated in opposing directions parallel to the circumference of the disk while being moved apart or together in the direction in which the disks are stacked, with the connection between outer body 11 and inner body 12 being constantly maintained, the invention is capable of simplifying and reducing the size of the mechanism for opening and closing magazine 1 and ensures stable opening and closing of magazine 1 without requiring high precision in the positional relationship between magazine 1 and its open/close mechanism.

Furthermore, by using magazine 1, wherein outer body 11 and inner body 12 are rotated in opposing directions parallel to the circumference of the disk while being moved apart or together in the direction in which the disks are stacked, with the connection between outer body 11 and inner body 12 being constantly maintained, and a plurality of holders 30 respectively carrying a plurality of CDs are so contained in magazine 1 as to be capable of moving in the direction in which the disks are stacked together with the rotation of the outer body and the inner body, holder 30 carrying the CD to be played is chosen and engaged by selecting unit 57 from among holders 30, and inner body 12 is separated from outer body 12 by open/close unit 58. As a result, holders 30 located lower than holder 30 supported by selecting unit 57 descend under their own weight while rotating in opposing directions parallel to the circumference of the disks together with inner body 12, thereby opening a space under holder 30 supported by selecting unit 57 so that read out function may be performed in the space. Thus, while ensuring stable opening and closing of magazine 1 and selection of holder 30, the invention is effective in simplifying and reducing the size of the mechanism for opening and closing magazine 1 and selecting holder 30 which carries the CD to be played.

According to the present invention, it is ensured that arm 61 is held at its read/write position or the retreated position, because a pair of recesses 67 and 68 are formed in arm 61 at positions respectively corresponding to the read/write position and the retreated position of arm 61, and a cam shaft 154 for selectively catching recesses 67/68 is provided. Furthermore, by means of providing said cam shaft 154 in the path for transmitting driving force of a driving unit 59, cam shaft 154 is moved interlockingly with the pivot of arm 61 propelled by driving unit 59's pivot of arm 61 in such a manner that cam shaft 154 is engaged in recess 67 or 68 only when arm 61 is at its read/write position or the retreated position and disengaged from arm 61 during its pivotal movement. Thus, the invention is effective in simplifying the mechanism for supporting arm 61.

By means of driving force of motor 81 transmitted through an interlocking means consisting of cylinder 142, sliding plate 94 and the like, arm 61 and selecting member 98 are moved in a body in the direction in which the disks are stacked in magazine 1. In other words, a single driving means, i.e. motor 81, is sufficient to move arm 61 and selecting member 98. Therefore, the invention is capable of simplifying the structure of the device and at the same time ensures correspondence of the position of arm 61 to the position of holder 30 selected by selecting member 98 with respect to the direction in which the disks are stacked.

It is to be noted that read/write disks mentioned in the above explanation include read-only disks and disks which can be used for both data reading and writing. In other words, record reproduction disks referred to herein are not limited to compact disks but also include video disks, read/write magneto-optical disks, magnetic disks and the like, and the present invention is applicable to all and any type of devices which performs reading and/or writing of these read/write disks.

In case of a read/write device for reading and writing data from and onto magnetic disks, a read/write head for reading and writing magnetic data from and onto a magnetic disk is used as read/write Although magazine 1 of the embodiment explained above has an inner body 12 fired in outer body 11, this inside-outside combination between bodies 11 and 12 may be the other way around without departing from the scope or the spirit of the invention as defined in the appended claims. Furthermore, in cases where outer body 11 is rotated to open or close magazine 1, outer body 11 may be provided with female parts of engagement, such as a lever portion 26 and a catching recess 27, to be engaged with male parts of engagement, such as protruding portion 116 and catching portion 121 of slider 111 and the like.

In the configuration of a magazine of record reproduction disks according to claim 1 of the present invention, outer body 11 and inner body 12 are rotated in opposing directions parallel to the circumference of the disks and moved apart or together in the direction in which the disks are stacked, thereby opening and closing, while being constantly connected to each other. Therefore, the present invention is capable of opening and closing the outer body and the inner body in a stable condition with a simple configuration and also increasing a number of read/write disks to be contained in the magazine within a specified vertical dimension. Furthermore, by using a magazine which remains connected, the invention is capable of simplifying the structure of a read/write device.

According to a method of reading and writing of read/write disks as claimed in claim 2, by using a magazine comprising an inner body and an outer body which move in opposing directions apart or together, thereby opening and closing with connection therebetween maintained, the magazine is opened from a side thereof without completely separating inner body and the outer body of the magazine, and at the same time a number of disks from among a plurality of read/write disks disposed in a stack is moved in the direction in which the disk are stacked, thereby opening a space that faces the read/write disk to be read or written, and a read/write unit is advanced into the space so that the read/write disk may be rotated where it remains in the stack by the driving system of the read/write unit and read or written by a write/read head or a laser pickup without pulling the read/write disk out of the magazine. Therefore, the invention is capable of simplifying the structures of the magazine itself as well as other parts, such as the mechanism for opening and closing the magazine, and also eliminates the necessity of high precision in positional relationship between the magazine and its open/close mechanism while reducing the size of the read/write device.

In the configuration of a read/write device for read/write disks according to claim 3 of the invention, by using a magazine comprising an inner body and an outer body which move in opposing directions apart or together, thereby opening or closing while maintaining connection to each other, the magazine is opened from a side thereof without completely separating the inner body and the outer body of the magazine, and at the same time a number of disks from among a plurality of read/write disks disposed in the stack are moved in the direction in which the disks are stacked, thereby opening a space that faces the read/write disk to be read or written, and a read/write unit is advanced into the space so that the read/write disk may be rotated where it remains in the stack and data is read or written by the write/read unit without pulling the read/write disk out of the magazine. Therefore, the device according to the invention is capable of simplifying the structures of the magazine itself as well as other parts, such as the mechanism for opening and closing the magazine, and also eliminates the necessity of high precision in positional relationship between the magazine and its open/close mechanism while reducing the size of the read/write device.

In the configuration of a read/write device for read/write disks according to claim 4 of the invention, by using a magazine wherein its inner body and outer body are capable of rotating in opposing directions parallel to the circumference of the disks and move apart and together concurrently with their rotation, thereby opening and closing while maintaining connection to each other, the outer body and the inner body are opened or closed with respect to each other by means of rotating a slider in one direction or the other, the slider being engaged with either the outer body or the inner body through catching portions. Therefore, the device according to the invention is capable of simplifying and reducing the size of the mechanism for opening and closing the magazine and performing the open/close function of the magazine in a stable condition without requiring high precision in positional relationship between the magazine and its open/close mechanism.

In the configuration of a read/write device for read/write disks according to claim 5 of the invention, by using a magazine wherein its inner body and outer body are capable of rotating in opposing directions parallel to the circumference of the disk and move apart or together concurrently with their rotation, thereby opening or closing while maintaining connection to each other, said magazine containing a plurality of holders each carrying a read/write disk in such a manner that the holders are capable of moving in the direction in which the disks are stacked concurrently with said rotation parallel to the circumferences of the disks, the holder carrying a read/write disk to be written or read out is selected from among the plurality of holders and prevented by a selecting mechanism from moving. Then, by opening the outer body and the inner body by means of an open/close mechanism, the holders located lower than the holder supported by the selecting mechanism descend under their own weight while rotating in a direction parallel to the circumference of the disk, thereby opening a space under the holder supported by the selecting mechanism to permit write/read function to be performed. Therefore, the device according to the invention is capable of simplifying and reducing the size of the mechanism for opening and closing the magazine and selecting a holder which carries a read/write disk, and the device is also capable of stable opening and closing of the magazine and selection of a holder.

In the configuration of a read/write device for read/write disks according to claim 6 of the invention, the arm is provided with a pair of female parts of engagement at positions respectively corresponding to the read/write position and the retreated position of the arm, and the arm is held at its read/write position or the retreated position in a stable condition by means of a catching portion which selectively catches these female parts of engagement. Furthermore, by means of providing said catching portion in the path for transmitting driving force of a driving mechanism, the catching portion, moving together with pivotal movement of the arm by the driving mechanism, catches an appropriate female part of engagement only when the arm is at its read/write position or the retreated position and remains disengaged from the arm during its pivot. Thus, the invention is effective in simplifying the mechanism for supporting the arm.

In the configuration of a read/write device for read/write disks according to claim 7 of the invention, as it is possible to move, through an interlocking means, both the selecting means and the arm together in the direction in which the disks are stacked by means of operating a driving means, the device requires only a single driving means. Therefore, the invention is capable of simplifying the structure of the device and at the same time ensures correspondence of the position of a holder selected by the selecting member to the position of the arm with respect to the direction in which the disks are stacked.

Having described preferred embodiments of the invention with reference to the accompanying drawings, it is to be understood that the invention is not limited to those precise embodiments, and that various changes and modifications may be effected therein by one skilled in the art without departing from the scope of spirit of the invention as defiend in the appended claims.

What is claimed is:

1. A magazine for read/write disks comprising:

an outer body;

an inner body located inside said outer body;

a connection supporting means which is provided at a side of the magazine, wherein said inner body and said outer body overlap each other, and wherein said connection supporting means maintains connection between the outer body and the inner body while permitting the outer body and the inner body to rotate in opposing directions parallel to the circumference of the disks and, concurrently with this rotation, move apart or together in the direction in which the disks are stacked, thereby opening or closing a space formed next to and directly below a selected one of said plurality of disks; and a plurality of holders which each respectively support one of said plurality of read/write disks, said holders being so disposed in said inner body and movable in the direction in which the disks are stacked together with rotation of said inner body in a direction parallel to the circumference of the disks thereby creating said space.

2. A magazine for housing a plurality of read/write disks, comprising:

an outer body;

an inner body received within said outer body;

said inner and outer bodies being disposed in concentric relation to one another and being independently rotatable about a common axis of rotation;

an interconnection means for connecting respective peripheral edges of said outer and inner bodies to one another;

said interconnection means having a helical configuration so that relative rotation between said outer and inner bodies in a first direction increases spacing between said outer and inner bodies in an axial direction along said common axis of rotation and so that relative rotation between said outer and inner bodies in a second direction opposite to said first direction decreases said spacing;

a plurality of disk holders stacked within said magazine, said plurality of disk holders having a common central axis that is coincident with said common axis of rotation so that said disk holders are concentrically disposed with respect to one another and with respect to said outer and inner bodies;

engagement means positioned at an outer periphery of said magazine for selectively engaging an outer periphery of a preselected disk holder of said plurality of disk holders;

whereby engagement of said preselected disk holder axially separates said preselected disk holder from an adjacent disk holder located immediately below said preselected disk holder when said outer and inner bodies are rotated relative to one another so that said relative rotation displaces said disk holders located below said preselected disk holder along said common central axis;

whereby a read/write means is insertable into said space between said preselected disk holder and said adjacent disk holders; and whereby when said engagement means is not used to engage a preselected disk holder, relative rotation between said outer and inner bodies creates said space adjacent a disk holder at a preselected end of said stack so that said read/write means may be inserted into said space.

* * * * *